United States Patent [19]
Tatsuzawa et al.

[11] Patent Number: 5,640,379
[45] Date of Patent: Jun. 17, 1997

[54] PHOTOMAGNETIC RECORDING DEVICE AND PHOTOMAGNETIC REPRODUCING DEVICE

[75] Inventors: Kaichi Tatsuzawa; Shosuke Tanaka; Shigeaki Koike, all of Kanagawa, Japan

[73] Assignee: Sony Corporation, Tokyo, Japan

[21] Appl. No.: 646,222

[22] Filed: Jan. 28, 1991

[30] Foreign Application Priority Data

Jan. 30, 1990 [JP] Japan .................. 2-20919

[51] Int. Cl.$^6$ .................................................. G11B 7/00
[52] U.S. Cl. ................... 369/59; 369/109; 369/48; 369/116; 369/13
[58] Field of Search ..................... 369/109, 116, 369/100, 32, 47, 58, 54, 34, 13; 358/342, 330

[56] References Cited

U.S. PATENT DOCUMENTS

| | | | |
|---|---|---|---|
| 4,646,103 | 2/1987 | Sugiyama et al. | 369/109 |
| 4,873,680 | 10/1989 | Chung et al. | 369/116 |
| 5,001,692 | 3/1991 | Farla et al. | 369/116 |
| 5,007,039 | 4/1991 | Sakemoto et al. | 369/116 |
| 5,038,338 | 8/1991 | Terao et al. | 369/116 |
| 5,065,377 | 11/1991 | Spruit et al. | 369/116 |
| 5,083,212 | 1/1992 | Owa et al. | 358/330 |

*Primary Examiner*—Muhammad N. Edun
*Attorney, Agent, or Firm*—William S. Frommer; Alvin Sinderbrand

[57] ABSTRACT

In a photomagnetic recording device where a record light beam irradiates a photomagnetic record medium to form a pit on the photomagnetic record medium, and a reproducing light beam irradiates the pit to reproduce the record information, the record light beam is pulsed intermittently at least at the beginning of the irradiation period so that a pit of substantially circular shape is formed on the photomagnetic record medium, whereby information is recorded with high accuracy.

7 Claims, 15 Drawing Sheets

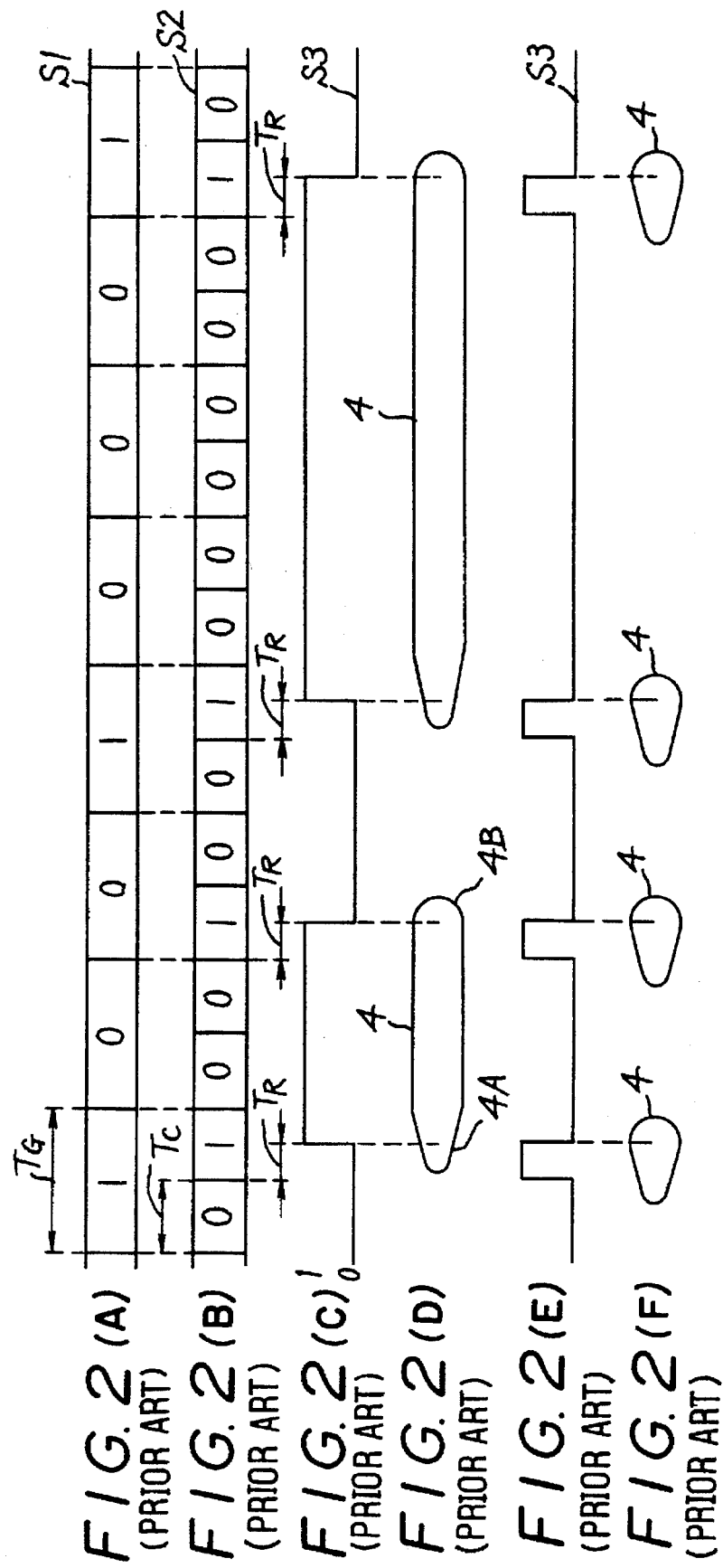

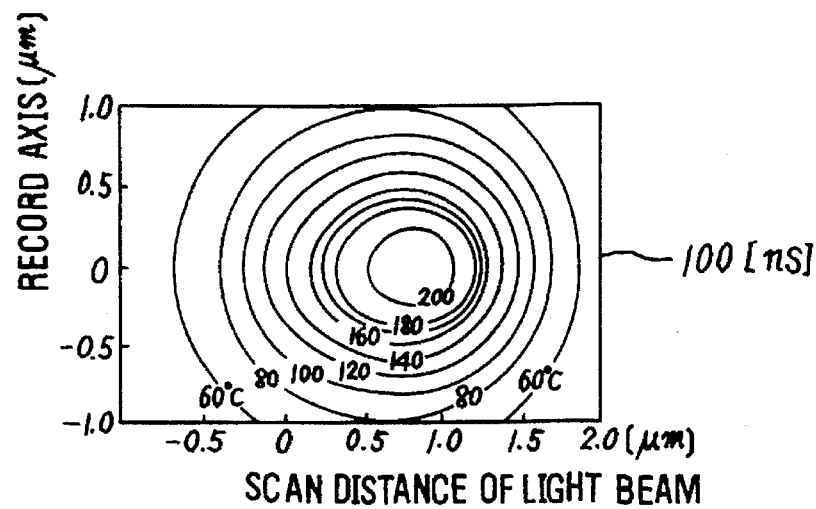
F I G. 3 (A) (PRIOR ART)
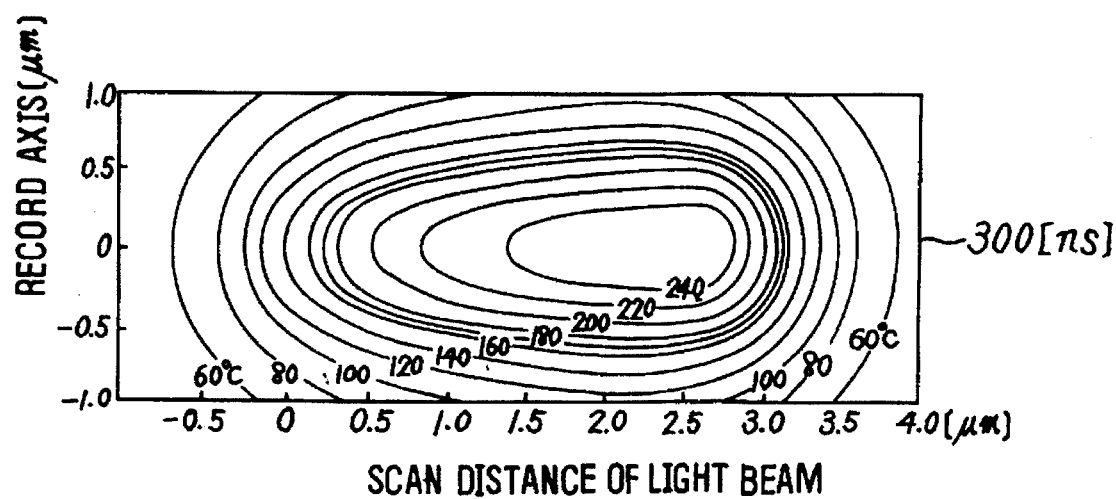
F I G. 3 (B) (PRIOR ART)

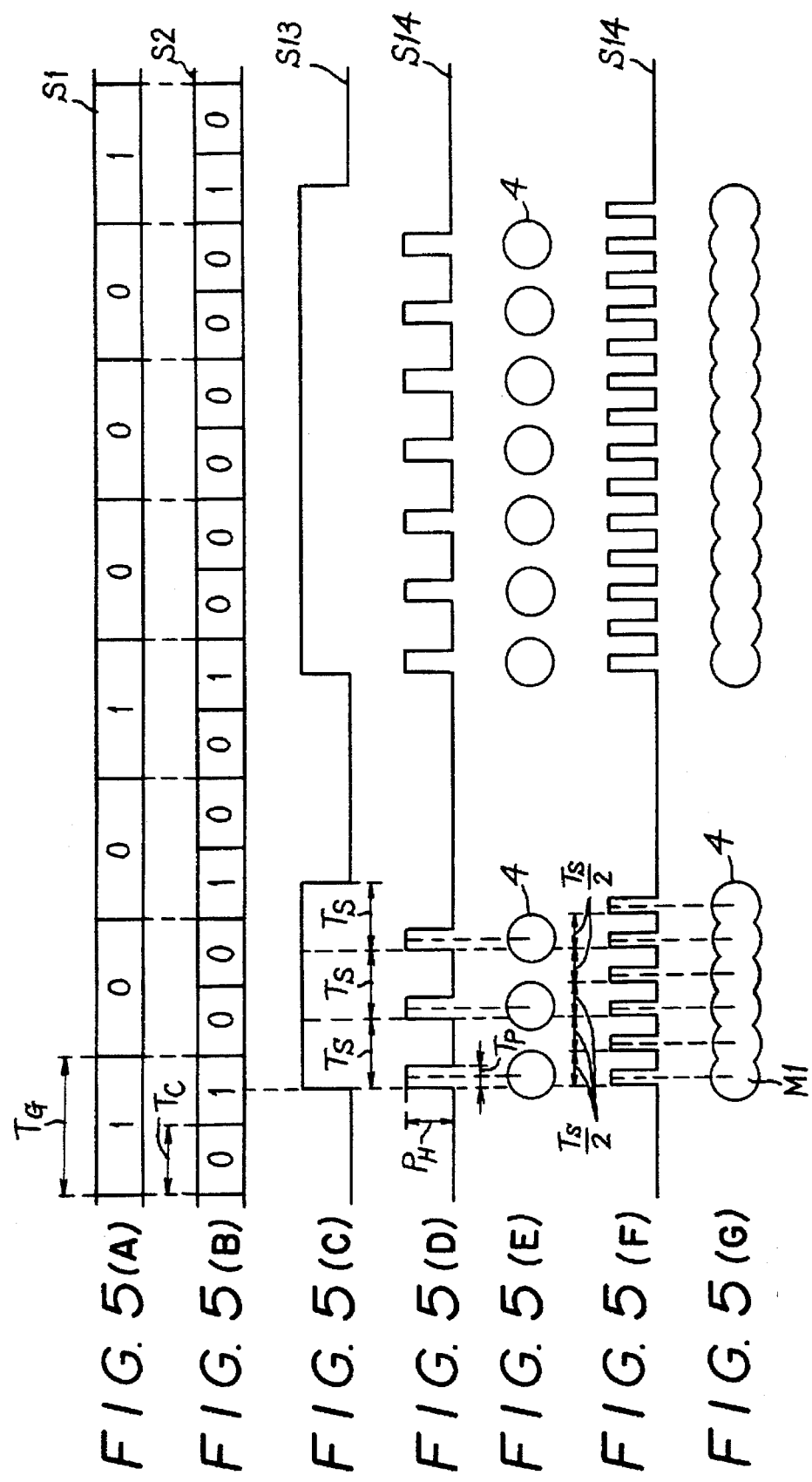

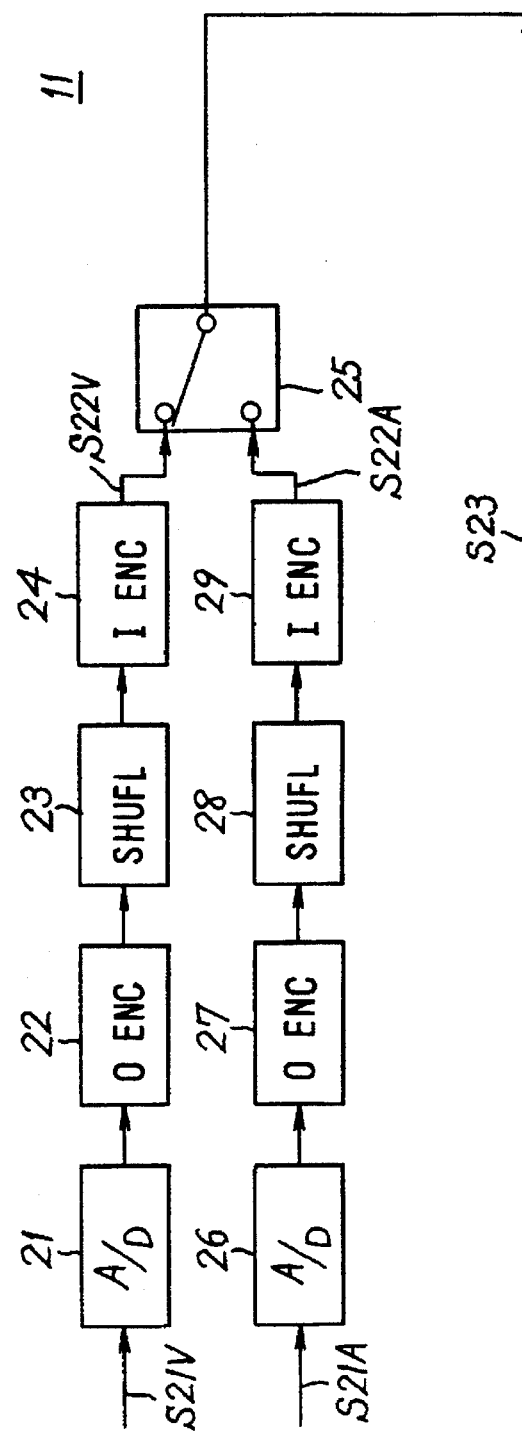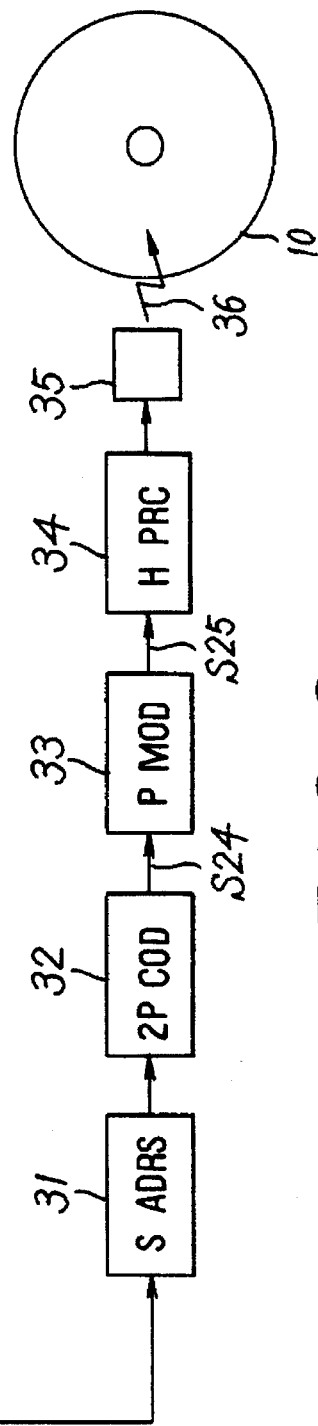
FIG. 6

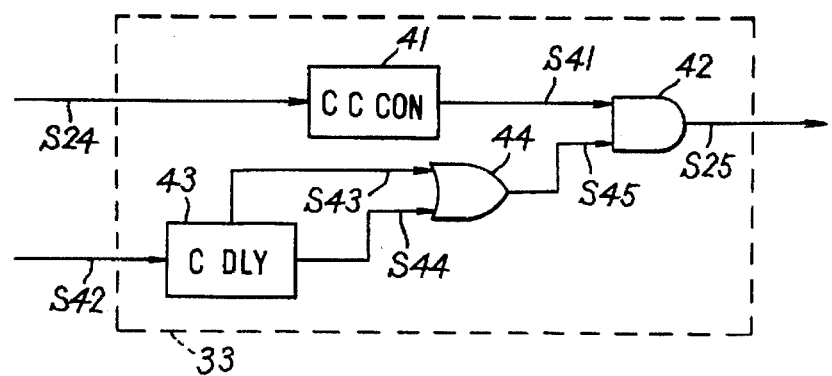
FIG. 8
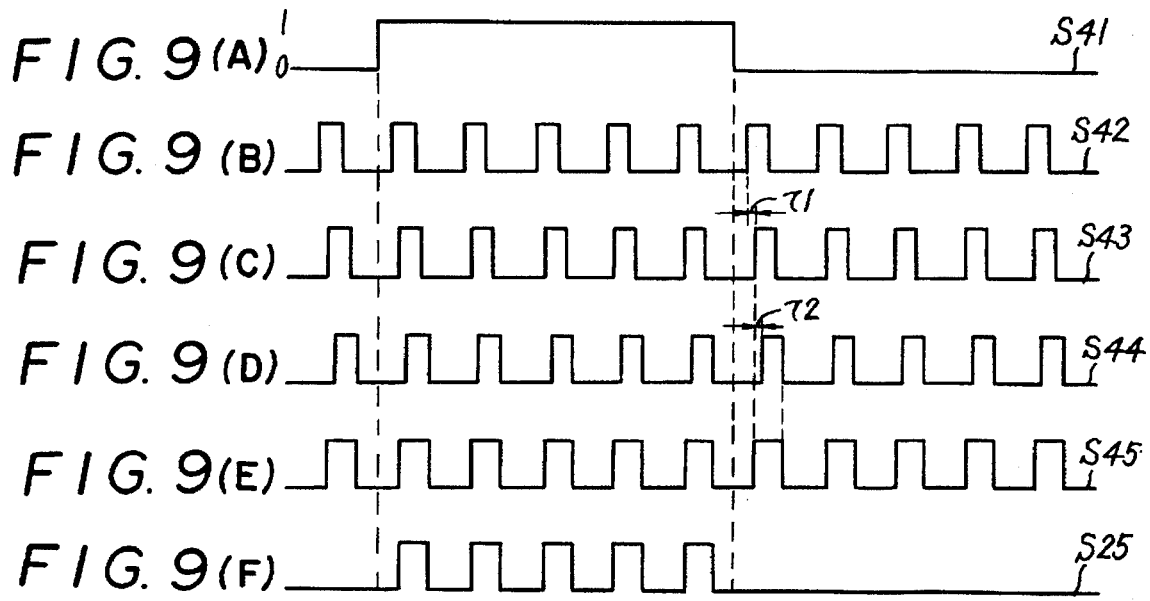
FIG. 9(A) S41
FIG. 9(B) S42
FIG. 9(C) S43
FIG. 9(D) S44
FIG. 9(E) S45
FIG. 9(F) S25

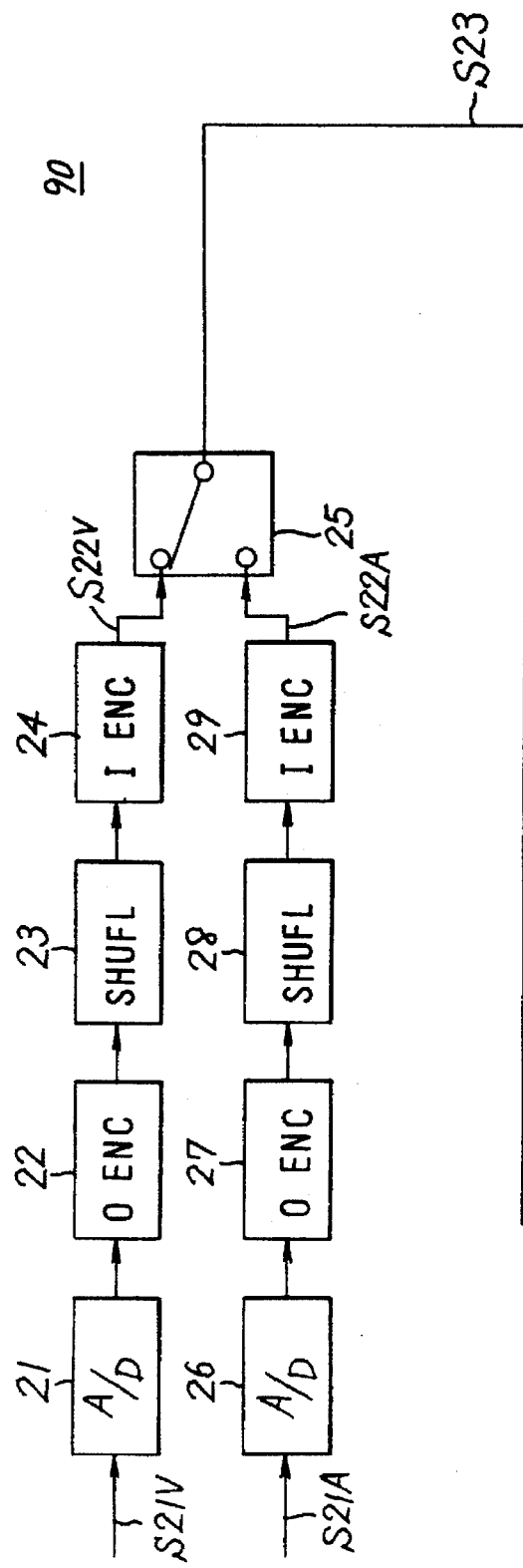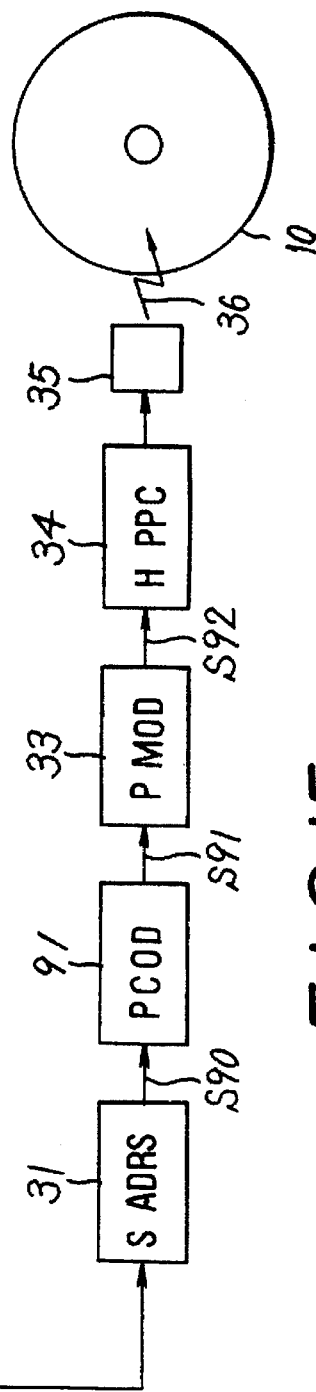
FIG. 15

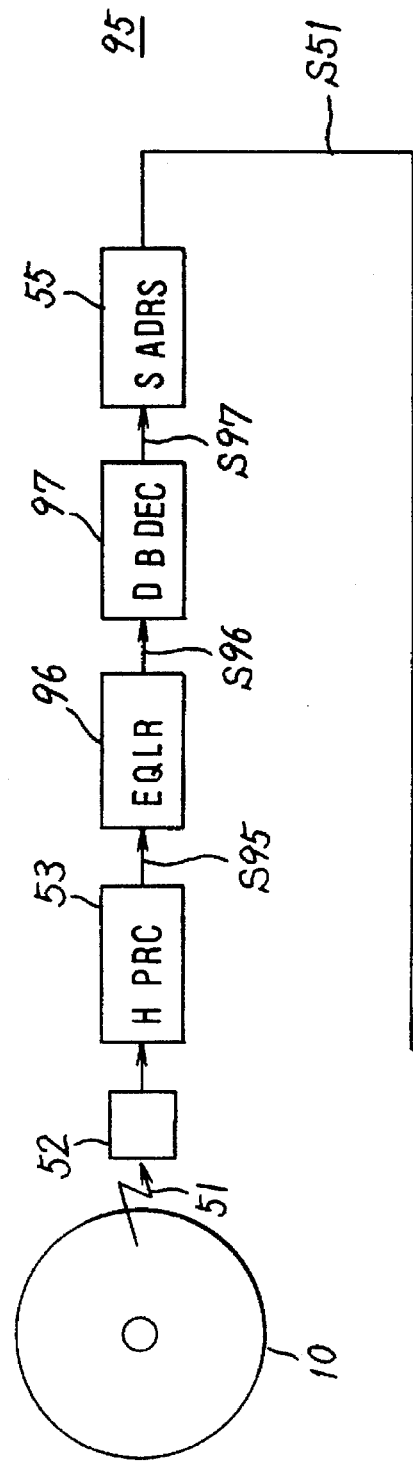
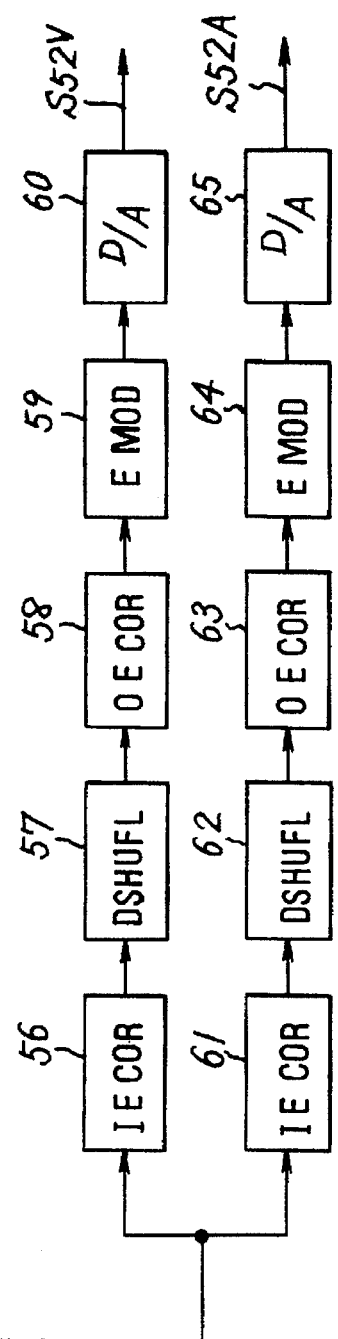
FIG. 16

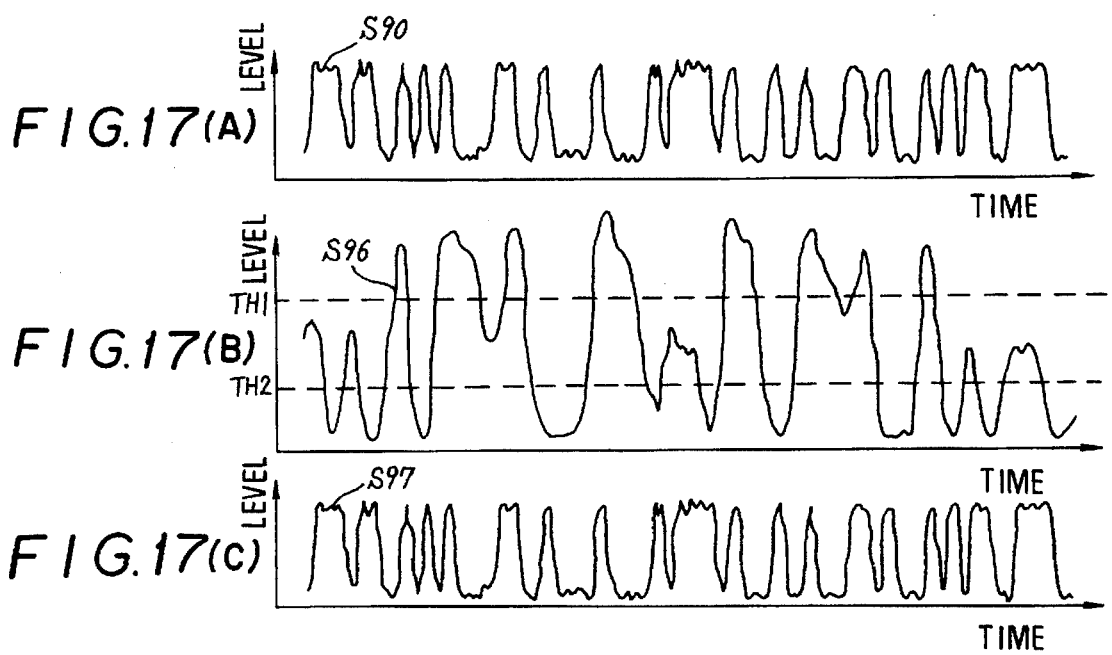
FIG.17(A)
FIG.17(B)
FIG.17(C)
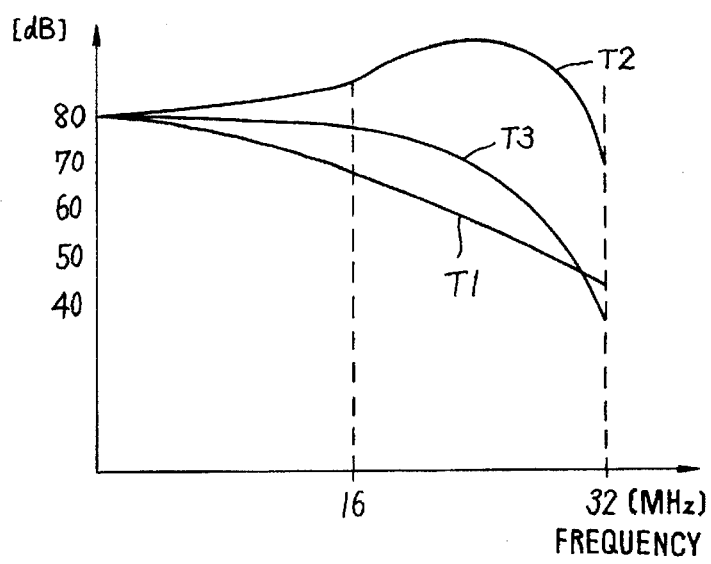
FIG.18

PHOTOMAGNETIC RECORDING DEVICE AND PHOTOMAGNETIC REPRODUCING DEVICE

BACKGROUND OF THE INVENTION

1. Field of the Invention

The present invention relates to a photomagnetic recording device and to a photomagnetic reproducing device, and more particularly to a device for improving the operation of a photomagnetic reproducing apparatus where a pit having a magnetic domain whose shape corresponds to recorded information is formed on a photomagnetic record medium.

2. Description of the Prior Art

In a photomagnetic recording apparatus as shown in FIG. 1, a record light beam 3 comprising a magnetizing magnetic flux 2 and a laser luminous flux irradiates a photomagnetic record disk 1 which rotates in the direction of arrow "a". An irradiation region on the disk formed by the record light beam 3 is heated to at least a prescribed temperature (Curie point temperature) whereby a magnetic domain constituting a pit 4 is formed in the irradiation region. Information is represented by timing (or record position) which forms the length of the pit 4 and/or the start end and the finishing end of the pit.

A light beam generator 5 for generating the record beam 3 as a function of a source signal S1 having the bit period $T_G$ shown in FIG. 2A functions to convert the source signal S1 into a code signal, for example, by NRZ conversion, producing a channel code signal S2 of bit period $T_c$ ($=T_G/2$), as shown in FIG. 2B. When a bit of the channel code signal S2 is a logic "1", a record signal S3 whose logic level undergoes a transition at a time delayed by the delay time $T_R$ ($=T_c/2$) form the beginning of the bit cell of signal S2 is generated as shown in FIG. 2C.

A light source comprising a laser diode for example is driven by the record signal S3, whereby the record light beam 3 emitted from the laser light source irradiates the photomagnetic record disk 1 with the timing of the transition in the record signal S3 rising to the logic "1" level. As a result, the pit 4 having a magnetic domain as shown in FIG. 2D is formed on the photomagnetic record disk 1.

The position at which the start end 4A of the pit 4 is formed corresponds to the bit cell containing a logic "1" bit in the channel code signal S2, and the position at which the finishing end 4B is formed corresponds to the bit cell containing the logic "1" bit that is subsequently generated in the signal S2. Thus the record information representing the channel code signal S2 can be recorded as a magnetization pattern on the photomagnetic record disk 1 with the length between or positions of the start end 4A and the finishing end 4B of the pit 4 identifying the occurrences of logic "1"s.

As shown in FIGS. 2E and 2F, a record signal S3 having a predetermined pulse width may be generated in synchronism with the timing of the channel code signal S2 as the channel code signal becomes a logic "1" so as to form a pit 4 having an isolated magnetic domain which may also be used.

However, the shape of the magnetic domain of the pit 4 formed on the photomagnetic record disk 1 is tapered towards the top or beginning of the start end 4A (having a so-called tear drop shape) in practice. Consequently, when the pit 4 is to be reproduced, there is the risk of generating a data error in the reproduced signal when the start end 4A is scanned.

In addition, since the width of the magnetic domain becomes narrower towards the top or beginning of the start end 4A of the pit 4, the leakage magnetic flux generated from the magnetic domain at this end becomes weak. As result, the precise start position of the start end 4A cannot be unambiguously reproduced.

The pit 4 exhibits the tear drop shape at the start end 4A because when the light beam 3 begins to irradiate the photomagnetic record disk 1, the disk travels in the direction "a", whereby the accumulated quantity of the laser light irradiated to the top of the start end is less than that in the rearward portion which follows the top end. It has been confirmed experimentally that the temperature distribution of the magnetic domain on the photomagnetic record disk 1 irradiated by the record light beam 3 becomes significantly larger into the tear drop shape in the case of a long irradiation time in comparison to the case of a short irradiation time as shown in FIGS. 3A and 3B.

FIG. 3B shows the shape of the magnetic domain when the record light beam 3 irradiates the disk continuously for a duration of 300 ns. In this case, the shape of an equi-temperature line is the tear drop shape and therefore the shape of the equi-temperature line representing the Curie point also has the tear drop shape. However, when the irradiation time of the record light beam 3 is reduced to about ⅓ of this duration, e.g. 100 ns, the shape of the equi-temperature line no longer appears as a pronounced tear drop shape.

As shown in FIG. 4, the degree of the asymmetry of the thermal distribution may become significant as the irradiation time duration becomes long.

When the record light beam irradiates photomagnetic record disk 1, the temperature rise produced at the position (x, y, Z) of the disk by thermal diffusion can be expressed by the following formula.

$$T(x, y, z) = \int_{-\infty}^{t} \int_{-\infty}^{\infty} \int_{-\infty}^{\infty} G(x-x_o, y-y_o, z, t-t_o) Q(x_o, y_o, t_o) dx_o dy_o dt_o \quad (1)$$

This is the convolution of the Green function G and the power distribution function Z, and it is seen that if the pulse width of the record signal S3 increases, the influence of the thermal diffusion becomes significant. As a result, the asymmetry of the thermal diffusion increases and the tear drop shape becomes significant.

To prevent this tear drop phenomenon of the magnetic domain, the intensity of the laser power of the record light beam forming the top end or beginning portion of the pit 4 may be controlled when forming the pit. In this case, however, bit separation during reproduction is not complete, and such intensity control is a less than satisfactory solution of the problem.

SUMMARY OF THE INVENTION

Therefore, an object of this invention is to provide photomagnetic recording/reproducing apparatus wherein when information is recorded on and reproduced from a photomagnetic record medium, the risk of producing an error in the reproduced data because of the tear drop shape phenomenon of the recorded pit is effectively avoided.

As an aspect of the invention, a record light beam irradiates a photomagnetic record medium in response to a record signal to form a pit on the photomagnetic record medium, the record light beam being pulsed intermittently so that the pit is formed with a magnetic domain that is substantially circular in shape with these circular shapes being arranged in sequence to be overlapped or alternatively isolated.

As another aspect of the invention, the record light beam is generated intermittently corresponding to the period of a carrier signal, whereby a pit representing frequency modulation information is formed. The record light beam corresponding to the beginning portion and the finishing portion of the pit is generated in isolated pulse shape so that a magnetic domain of substantially overlapped circular shapes form a pit portion.

As a further aspect of the invention, the record light beam is pulsed intermittently to form a pit with a magnetic domain of substantially circular shape with these circular shapes being arranged to be overlapped or alternatively isolated. When the pit is scanned during reproducing, a multi-value code signal is obtained by irradiating the pit with a reproducing light beam.

By pulsing the record light beam intermittently, a magnetic domain of substantially circular shape is formed on a photomagnetic record medium, whereby the shape of a pit formed on the photomagnetic record medium is substantially non-tear drop shape.

Thus deterioration of reproduced information that would otherwise be recorded in a tear drop shape is avoided.

BRIEF DESCRIPTION OF THE DRAWINGS

FIGS. 2A–2F are signal representations helpful in explaining photomagnetic recording method known to the prior art;

FIGS. 3A and 3B are characteristic curve diagrams which explain tear drop shape phenomenon of a magnetic domain;

FIGS. 5A–5G are signal representations helpful in explaining the principle of photomagnetic recording method according to the present invention;

FIG. 6 is a block diagram of one embodiment of photomagnetic recording apparatus for effecting photomagnetic recording in accordance with this invention;

FIG. 8 is a block diagram of a pulse modulation circuit used in the photomagnetic recording apparatus of FIG. 6;

FIGS. 9A–9F are signal waveform diagrams of signals produced by respective components of the pulse modulation circuit;

FIG. 15 is a block diagram of another embodiment of photomagnetic recording apparatus in accordance with this invention;

FIG. 16 is a block diagram of an embodiment of photomagnetic reproducing apparatus for recovering the information recorded by the FIG. 15 embodiment;

FIGS. 17A–17C are signal waveform diagrams of signals produced in the photomagnetic recording apparatus and the photomagnetic reproducing apparatus of FIG. 15 and FIG. 16; and FIG. 18 are characteristic curves which are helpful in explaining the functions of some circuits included in the photomagnetic reproducing apparatus of FIG. 16.

DESCRIPTION OF THE PREFERRED EMBODIMENTS

Embodiments of the present invention now will be described in detail in conjunction with the accompanying drawings.

Figure 1:
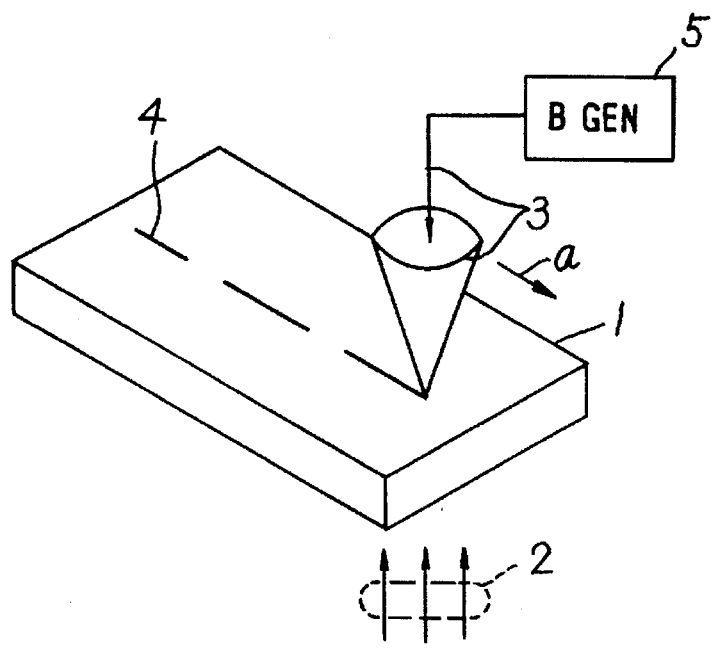
FIG. 1 is a perspective view helpful in explaining photomagnetic recording.
Figure 4:
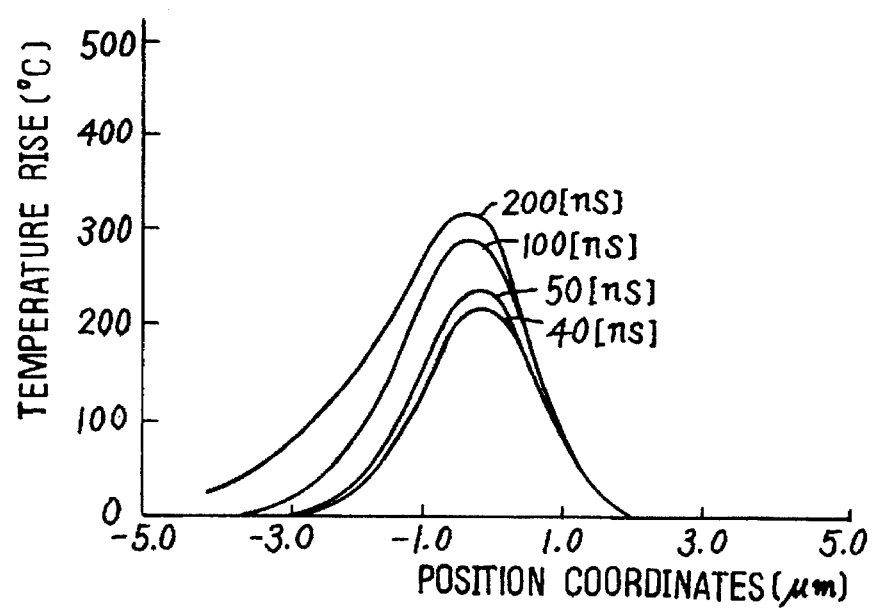
FIG. 4 is a characteristic curve diagram which is helpful in explaining the tear drop shape phenomenon of a magnetic domain.

Let it be assumed that the source signal S1 shown in FIG. 2A is to be recorded by the photomagnetic recording method according to the present invention. Accordingly, a record signal S13 (shown in FIG. 5C), based on a record source signal S1 (FIG. 5A) is produced from a channel code signal S2 (FIG. 5B). The record signal S13 is not used in its original condition as a drive signal to generate a record light beam 3 (FIG. 1), but as shown in FIG. 5D, drive pulses S14 obtained by sampling the record signal with a predetermined sampling period $T_s$ (for example, $T_s=T_c$) are generated. The pulse width $T_p$ and the pulse amplitude $P_H$ of the drive pulses S14 are selected such that when a laser light emission source is excited by each pulse S14, a pit 4 formed on photomagnetic record disk 1 by the record light beam 3 is substantially circular in shape.

Thus, as shown in FIG. 5E, when the record signal S13 is at its logic "1" level, pit 4 of substantially circular shape is formed at each sampling point $T_s$. However, when the record signal S13 is at its logic "0" level, the drive pulses S14 are not generated and pit 4 is not formed (as also shown in FIG. 5E).

Since the sampling period $T_s$ is selected to be substantially equal to the pit period $T_c$ of the channel code signal S2, the magnetic domains of substantially circular shape of pit 4 are isolated from each other and are arranged in a series of pits in a row. The pits formed on photomagnetic record disk 1, while the record signal S13 is at its logic "1" level, have magnetic domains that are isolated from each other and can be formed in sequence in a row. By reason of this arrangement, the number of magnetic domains in (or length) of pit 4 formed on the record disk can be easily discriminated, whereby the record signal S13 can be reproduced without ambiguity.

Also the start and end position of pit 4 corresponding to the rise or fall of the record signal S13 is readily discriminated to facilitate reproduction of the record signal S13 from photomagnetic record disk 1.

The sampling period $T_s$ of the drive pulses may be selected to be any desirable period, and as the sampling period is reduced to a smaller value, the number of magnetic domains in pit 4 generated while the record signal S13 is at its logic "1" level increases, whereby the distance between the magnetic domains having substantially circular shape is narrowed. However, as long as each pit 4 is isolated, the shape of the pit is of a generally circular shape similar to that shown in FIG. 5E.

As shown in FIGS. 5F and 5G, when the sampling period of the drive pulses is further reduced until successive magnetic domains constituting pit 4 overlap each other, the width of the recorded pit is slightly enlarged by the influence of the heating effect on the magnetic domain just in advance thereof. Also the magnetic domain at the start end is formed under substantially the same condition as that of the isolated pit and therefore it too becomes nearly circular in shape.

Consequently, the signal produced when the pits shown in FIG. 5E or FIG. 5G are scanned accurately corresponds to the record signal S13.

Figure 7:
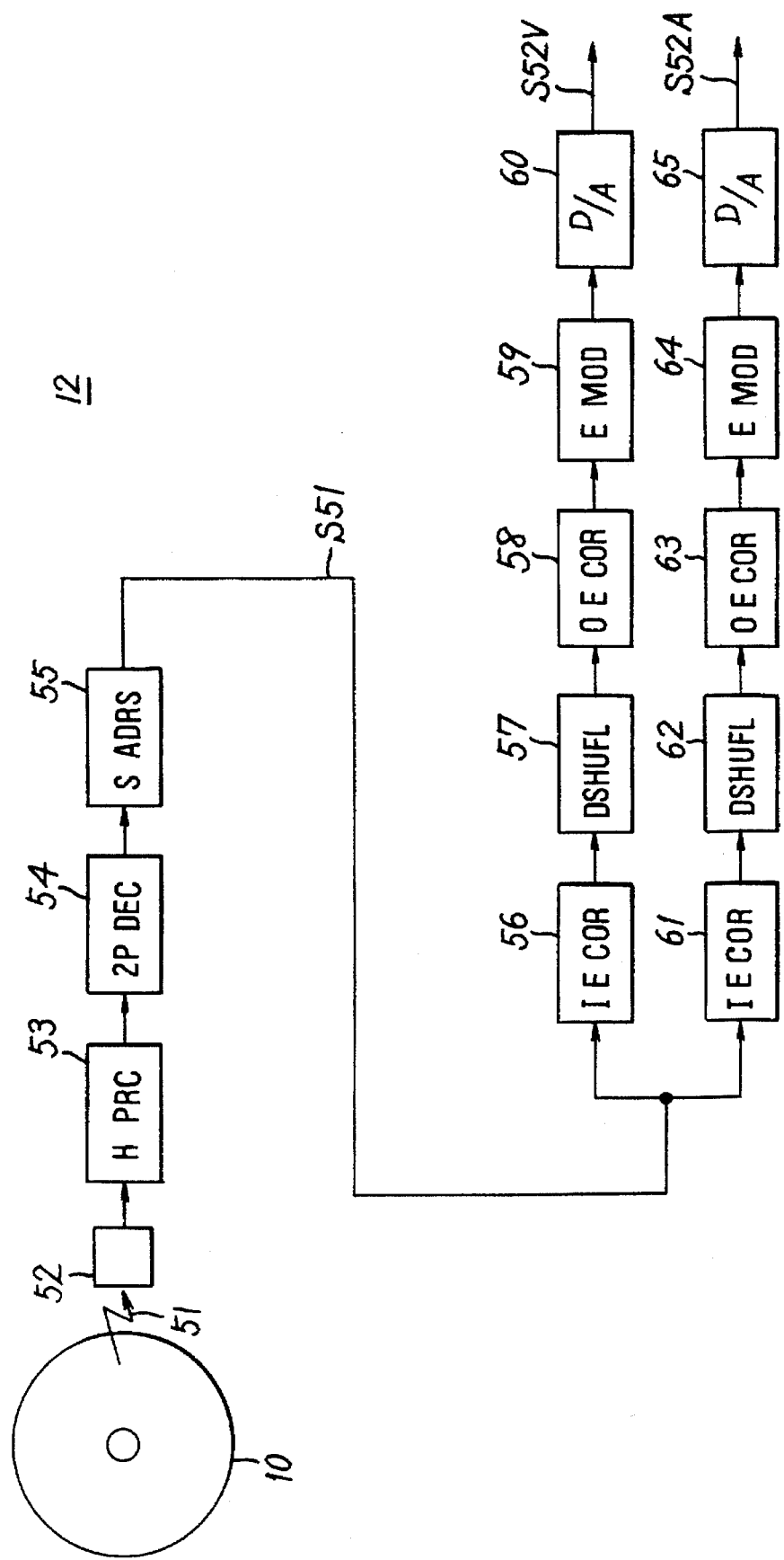
FIG. 7 is a block diagram of one embodiment of photomagnetic reproducing apparatus for recovering the information recorded by the FIG. 6 embodiment.

FIGS. 6 and 7 show a photomagnetic recording apparatus 11 and a photomagnetic reproducing apparatus 12 in accordance with a first embodiment for recording and reproducing digital information on a photomagnetic record disk 10 based on the principle of photomagnetic recording as described above in conjunction with FIGS. 5A–5G. In photomagnetic recording apparatus 11, a video input signal S21V is digitized by an analog/digital converter 21 and an outer error correction code is added thereto in an outer encoder 22. Then, the digital data is subjected to conventional shuffling processing in a shuffling circuit 23 and the resultant shuffled digital data has an inner error code added thereto in an inner encoder 24 to be supplied as video data S22V to a time division multiplexer 25. Outer encoder 22, shuffling circuit 23 and inner encoder 24 are conventional and known to those of ordinary skill in the art.

Also in photomagnetic recording apparatus 11, an audio input signal S21A is digitized by an analog/digital converter 26 and an outer error correction code is added thereto in an outer encoder 27. Then, the digital audio data is subjected to conventional shuffling processing in a shuffling circuit 28, and the resultant shuffled digital data has an inner error code added thereto in an inner encoder 29 to be supplied as audio data S22A to the time division multiplexer 25. Here too, outer encoder 27, shuffling circuit 28 and inner encoder 29 are conventional.

The video data S22A and the audio data S22B are subjected to time division combining in a predetermined format by time division multiplexer 25, and the resultant composite signal S23 has a synchronous signal and an address signal added thereto in a synchronous address adding circuit 31, as may be desired, and then the composite signal is converted in a two-phase coding circuit 32, into a record source signal S24 which is a two-phase code signal having different periods corresponding to the "1" or "0" signal level of the digital data. The two-phase code record source signal S24 is supplied to a pulse modulation circuit 33.

Assuming that the record source signal S24 is similar to the record source signal S13 described above, the pulse modulation circuit 33 generates a drive pulse signal S25 that is similar to the drive pulse signal S14 described above in conjunction with FIG. 5D, and the drive pulse signal S25 drives an optical head processor 34 which, in turn, drives a light source 35 comprising a laser diode to irradiate photomagnetic record disk 10 with a record light beam 36.

One embodiment of pulse modulation circuit 33 is shown in FIG. 8 and operates to convert the record source signal S24 in a channel code converter 41 into a record signal S41 (shown in FIG. 9A) having a determined width in response to the record information. The record signal S41 is supplied as a first input signal to an AND circuit 42.

Pulse modulation circuit 33 also delays a clock pulse S42 (FIG. 9B) in a clock delay circuit 43, producing first and second delay clock pulse signals S43 and S44 (FIGS. 9C and 9D) with clock pulse signal S43 delayed by delay time $T_1$ from clock pulse S42 and with clock pulse signal S44 delayed by delay time $T_2$ from delayed clock pulse signal S43. The delay clock pulse signals S43 and S44 are combined in an OR circuit 44 to form a composite clock pulse signal S45 (FIG. 9E). It is seen that the composite clock pulse signal S45 rises at the time delayed by the delay time $T_1$ from the rise time of the clock pulse signal S42, and has a pulse width that is a function of the delay time $T_2$. Consequently, when generating the drive pulse signal S25, the timing of the leading edge and the pulse width of these pulses may be varied, if desired.

The composite pulse signal S45 is supplied as a second input signal to the AND circuit 42, and is passed by the AND circuit while the record signal S41 is at its logic "1" level. The composite pulse signal provided at the output of AND circuit 42 is transmitted as the drive pulse signal S25 (FIG. 9F).

Thus pulse modulation circuit 33 produces the drive pulse signal S25 having a number of pulses corresponding to the period that the record signal S41 is at its logic "1" level; and this drive pulse signal is supplied to the optical head processor 34.

It is clear that in the photomagnetic recording apparatus 11 of FIG. 6, the light source 35 is not driven directly by the record signal S41 (FIG. 9A) which, in turn, is based on the record source signal S24. Rather, the drive pulse signal S25 generated during the logic "1" period of the record signal S41 is generated, and the light source 35 is driven intermittently by the drive pulse signal S25. Consequently, a substantially circular magnetic domain is formed at the start end of the pit 4 recorded on the photomagnetic record disk 10, whereby the record information at the start end of the pit is recorded correctly.

When the record information is reproduced from the pit 4 recorded on the photomagnetic record disk 10 by photomagnetic reproducing apparatus 12 of the type shown in FIG. 7, a light beam 51 is reflected from the photomagnetic record disk 10 to a light pickup 52, which supplies a corresponding pickup signal to an optical head processor 53. This processor supplies an information signal to a two-phase decoder 54 which decodes the information signal recovered from disk 10 and supplies it to a synchronous address decoder 55.

Thus a composite signal S51, similar to the composite signal S23 produced by time division multiplexer 25 of the photomagnetic recording apparatus 11, is obtained at the output of the synchronous address decoder 55, and video data included in the composite signal S51 is subjected to error correction processing in an inner error correction circuit 56 followed by deshuffling in a deshuffling circuit 57, followed by outer error correction processing in an outer error correction circuit 58 and error modification processing in an error modification circuit 59, as is conventional. The deshuffled, error corrected digital video signal is converted to analog form by a digital/analog converter 60 and the analog signal is transmitted as a video output signal S52V.

At the same time, audio data included in the composite signal S51 is processed by an inner error correction circuit 61, a deshuffling circuit 62, an outer error correction circuit 63, an error modification circuit 64 and a digital/analog converter 65, as is conventional, to be converted into an audio output signal S52A.

Thus, the record information is reproduced from pit 4 formed on photomagnetic record disk 10, and the shape at the start end of pit 4 is not a tear drop shape as in the prior art. Thus, the risk of generating an error from the start end of the pit is reduced significantly.

Figure 10:
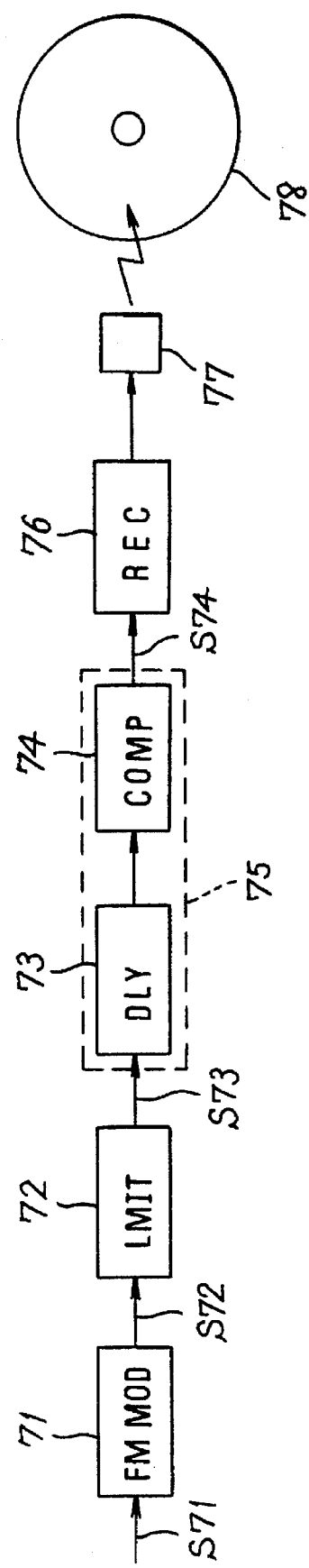
FIG. 10 is a block diagram of another embodiment of photomagnetic recording apparatus in accordance with this invention.

Referring now to FIG. 10, there is illustrated a second embodiment where an input signal is modulated in FM modulation and recorded on a photomagnetic record disk. In this embodiment analog information can be recorded.

Figure 13:
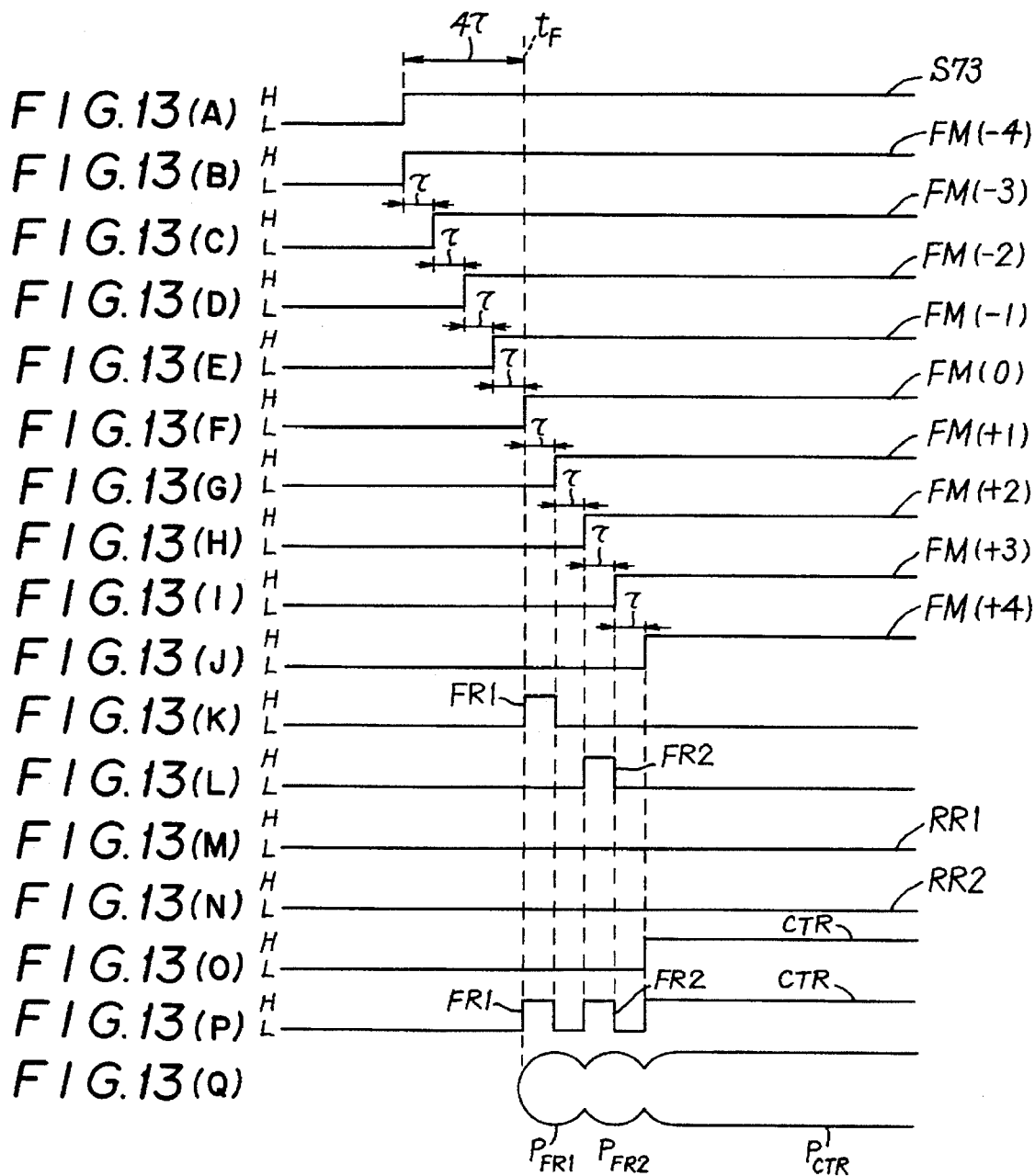
FIGS. 13A–13Q are signal waveform diagrams of signals produced in the delay and composite circuits of FIG. 11 and FIG. 12.
Figure 14:
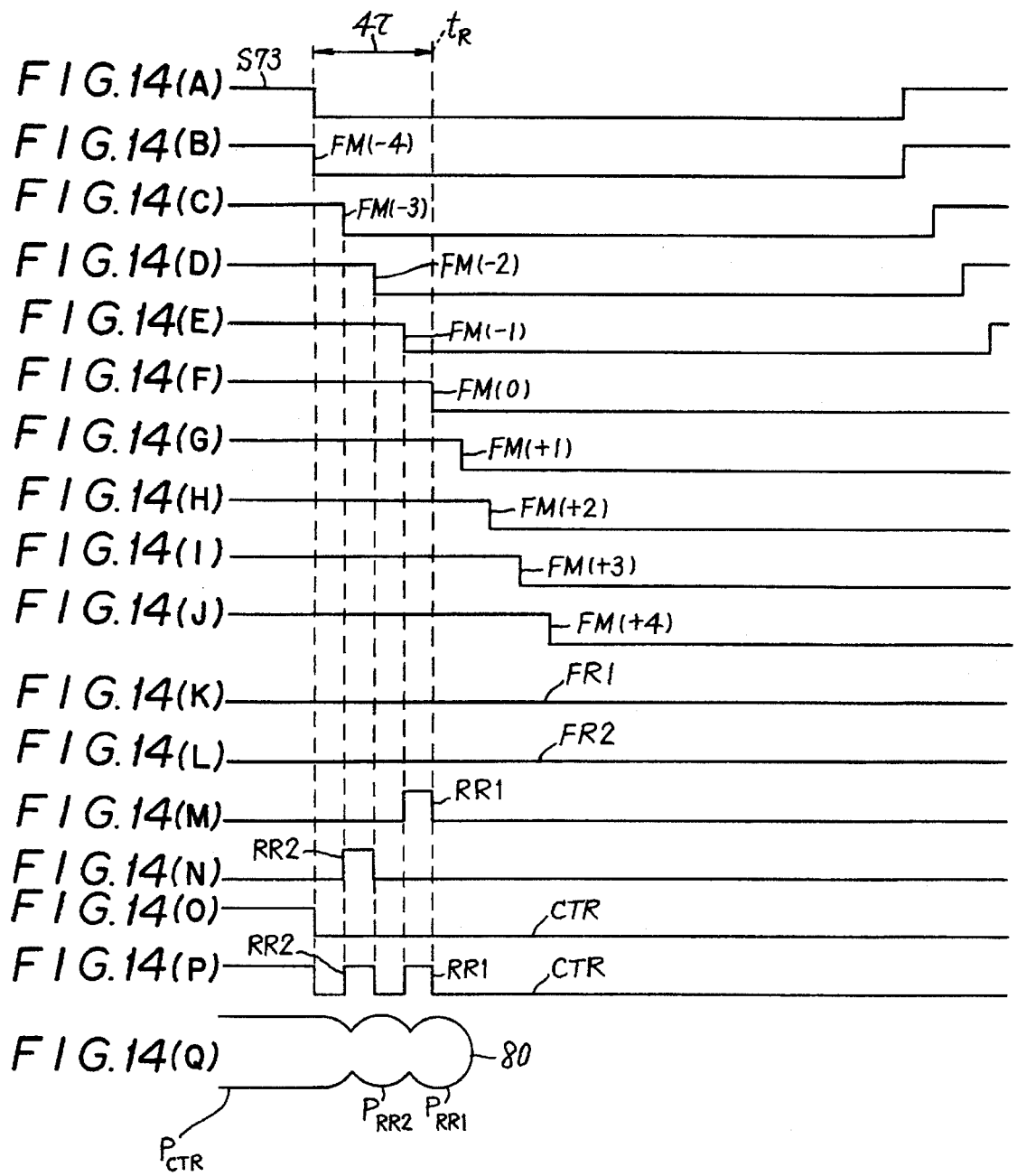
FIGS. 14A–14Q are signal waveform diagrams of the signals produced in the delay and composite circuits of FIGS. 11 and 12.

An input analog signal S71 is subjected to frequency modulation (FM modulation) by frequency modulating a carrier of predetermined frequency in an FM modulation circuit 71. The amplitude of the resultant FM modulation signal S72 is limited in a limiter 72 whereby an FM record signal S73 whose frequency is changed at the zero cross point of the carrier is formed. As shown in FIG. 13A and FIG. 14A, a transition in FM record signal S73 coincides with the zero cross point.

The FM record signal S73 is supplied to a record signal forming circuit 75 comprised of a delay circuit 73 and composite circuit 74. The record signal S74 produced by circuit 75 is recorded by way of a record circuit 76 and a light source 77 on a photomagnetic record disk 78.

Figure 11:
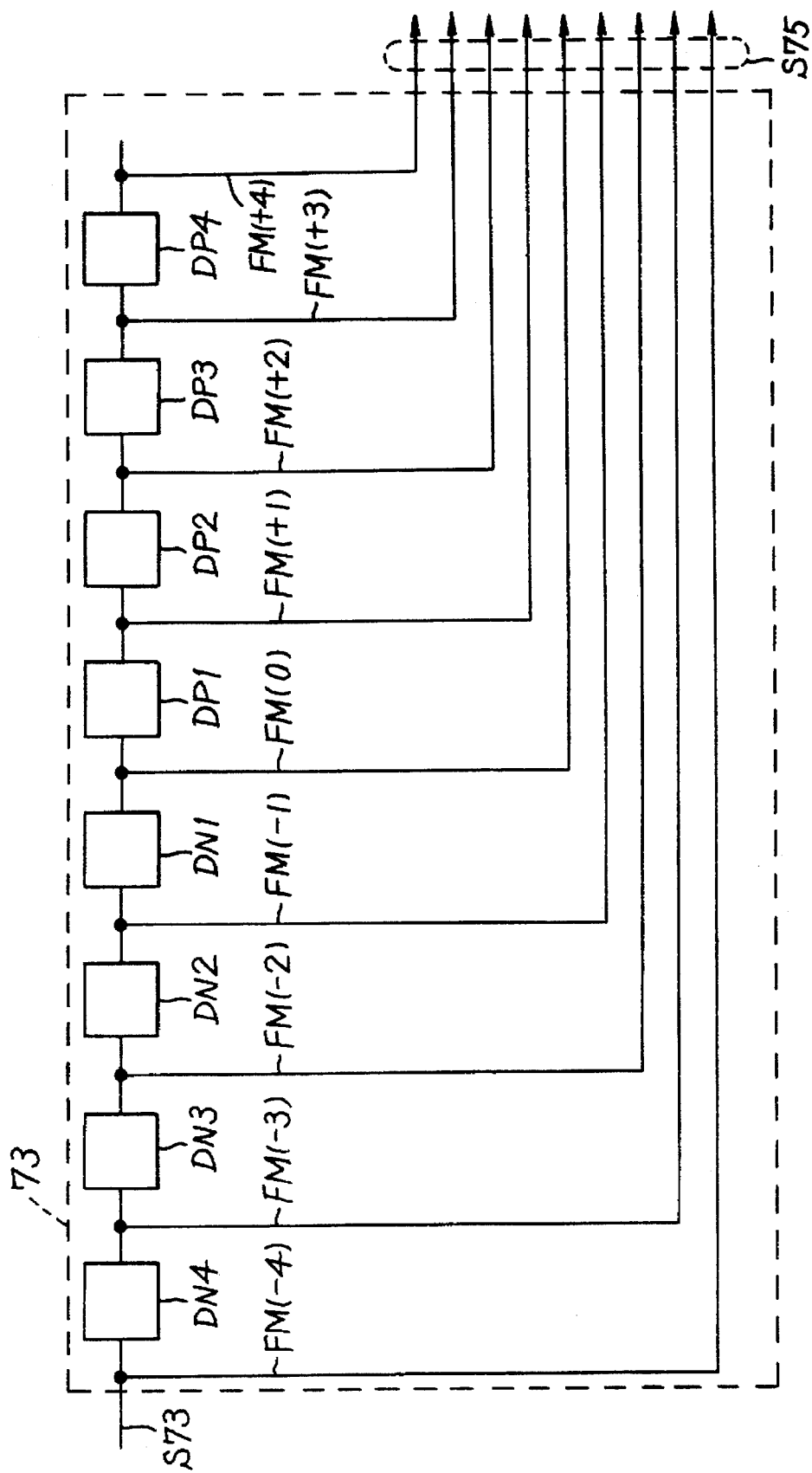
FIG. 11 is a schematic diagram of a delay circuit used in the photomagnetic recording apparatus of FIG. 10.

The delay circuit 73 is shown in FIG. 11 as comprising eight delay elements DN4, DN3, DN2, DN1, DP1, DP2, DP3, DP4 connected in series, and each exhibiting the delay time τ. As is clear from FIG. 11, the delay signal FM(−4) (shown in FIG. 13B and FIG. 14B) is the FM record signal S73 at the input stage, and delay signals FM(−3) (shown in FIG. 13C and FIG. 14C), FM(-2) (shown in FIG. 13D and FIG. 14D), FM(−1) (shown in FIG. 13E and FIG. 14E), FM(0) (shown in FIG. 13/and FIG. 14F)), FM(+i) (shown in FIG. 13G and FIG. 14G), FM(+2) (shown in FIG. 13H and FIG. 14H), FM(+3) (shown in FIG. 13I and FIG. 14I) and FM(+4) (shown in FIG. 13J and FIG. 14J) are generated at progressively delayed times, each time delay circuit imparting an additional delay time τ in sequence.

As a result, the relative timing of the nine delay signals FM(−4)–FM(+4) may be thought of as being referenced to the center delay signal FM(0) which rises at the time $t_F$ delayed by the delay time 4τ from the leading edge of the FM record signal S73. Hence, record signal S73 also is referred to as the delay signal FM(−4). From FIG. 14F, it is seen that the center delay signal FM(0) falls at the time $t_R$ delayed by the delay time 4τ from the trailing edge of the delay signal FM(−4). The group S75 of delay signals is comprised of the four delay signals arranged in sequence both in preceding time relation and in following time relation to the center delay signal FM(0) and is supplied as the output of delay circuit 73 to composite circuit 74.

Figure 12:
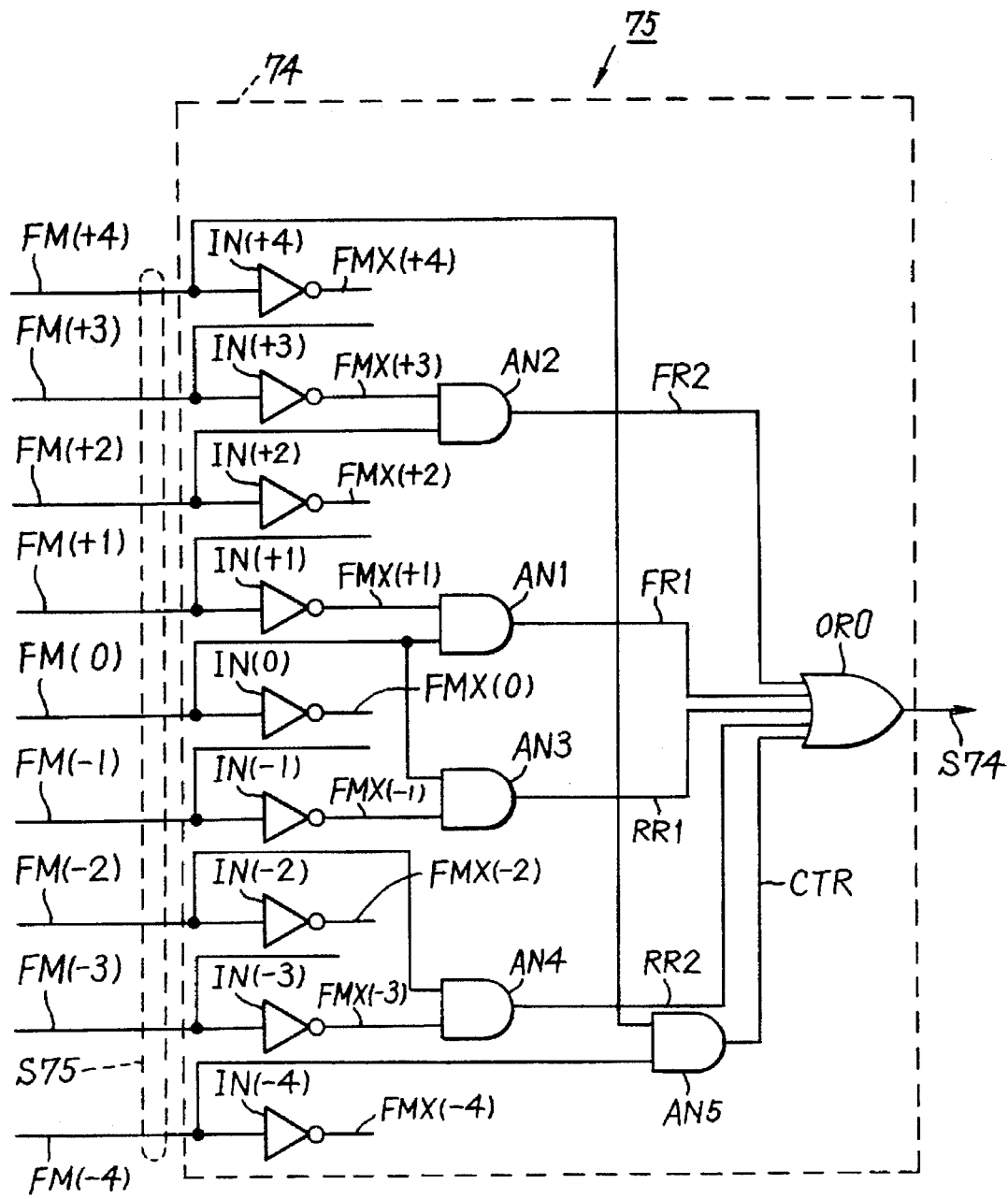
FIG. 12 is a logic diagram of a composite circuit used in the photomagnetic recording apparatus of FIG. 10.

The composite circuit, as shown in FIG. 12, is comprised of inverters IN(−4)–IN(+4) to obtain inverted delay signals FMX(−4)–FMX(+4) by inverting each of the delay signals FM(−4)–FM(+4), and a gate arrangement to gate respective ones of these delay signals FM(−4)–FM(+4) and FMX(−4)–FMX(+4) for producing a plurality of pulse waveforms at time positions symmetric with respect to the center position of the positive pulse interval of the center delay signal FM(0).

More particularly, an AND circuit AN1 performs an AND operation on the center delay signal FM(0) and the inverted delay signal FMX(+1) as expressed by the following formula $$FM(0) \cdot FMX(+1) = FR1 \quad (2)$$

whereby a so-called front isolation pulse FR1 having a duration equal to the time delay τ is formed at the leading edge of the center delay signal FM(0) as shown in FIG. 13K.

An AND circuit AN2 performs an AND operation on the delay signal FM(+2) and the inverted delay signal FMX(+3) as expressed by following formula $$FM(+2) \cdot FMX(+3) = FR2 \quad (3)$$

whereby another front isolation pulse FR2 having a duration equal to the time delay τ is formed after a delay time τ following the trailing edge of the first isolation pulse FR1 as shown in FIG. 13L.

An AND circuit AN3 performs an AND operation on the center delay signal FM(0) and the inverted delay signal FMX(−1) as expressed by following formula $$FM(0) \cdot FMX(-1) = RR1 \quad (4)$$

whereby a so-called rear isolation pulse RR1 having a duration equal to the delay time τ and a trailing edge coinciding with the trailing edge of the center delay signal FM(0) is formed as shown in FIG. 14M.

An AND circuit AN4 performs an AND operation on the delay signal FM(−2) and the inverted delay signal FMX(−3) as expressed by following formula $$FM(-2) \cdot FMX(-3) = RR2 \quad (5)$$

whereby another rear isolation pulse RR2 having a pulse width τ and preceding the leading edge of the first rear isolation pulse RR1 by an interval τ is formed as shown in FIG. 14N.

An AND circuit AN5 performs an AND operation on the delay signals FM(−4) and FM(+4) as expressed by following formula $$FM(-4) \cdot FM(+4) = CTR \quad (6)$$

thereby producing a center continuous pulse CTR whose leading edge is delayed by the time τ from the trailing edge of the second front isolation pulse FR2 as shown in FIG. 13O and whose trailing edge precedes by the time τ the leading edge of the second rear isolation pulse RR2 as shown in FIG. 14O.

An OR circuit OR0 performs an OR operation on the first and second front isolation pulses FR1 and FR2, the first and second rear isolation pulses RR1 and RR2 and the center continuous pulse CTR obtained from the AND circuits AN1–AN5 as expressed by following formula $$S74 = FR1 + FR2 + CTR + RR2 + RR1 \quad (7)$$

to produce the composite signal shown in FIG. 13P and FIG. 14P.

This signal is produced during the interval of the center delay signal FM(0), i.e. from $t_F$ to $t_R$, with the center continuous pulse CTR occurring at the approximate center time position of this interval and having the two front isolation pulses FR2 and FR1 at the forward side thereof and the two rear isolation pulses RR2 and RR1 at the rearward side thereof. This record signal S74 (shown in FIGS. 13P and 14P) is transmitted from the composite circuit 74 to record circuit 76.

Since the record signal S74 is used to drive light source 77 to irradiate photomagnetic record disk 78, the position on the disk surface corresponding to the center continuous pulse CTR exhibits a thermally stable state, whereby a center pit portion $P_{CTR}$ with specific width is formed as shown in FIG. 13Q and FIG. 14Q.

In the forward portion and in the rearward portion (hence the start end portion and the finishing end portion) of the center pit portion, front end pit portions $P_{FR2}$, $P_{FR1}$ and rear end pit portions $P_{RR2}$, $P_{RR1}$ are formed in response to the isolation pulses FR2, FR1 and RR2, RR1 of the record signal S74.

The front end pit portions $P_{FR2}$, $P_{FR1}$ and the rear end pit portions $P_{RR2}$, $P_{RR1}$ are formed by isolated pulses and therefore do not exhibit the tear drop shape. Hence, the shape of the top end of the front end pit portion $P_{FR1}$ and the position of the rear end of the rear end pit portion $P_{RR1}$ can be readily detected and the position information representing the FM signal can be reproduced with high accuracy.

Referring to FIGS. 15 and 16 where components corresponding to those of FIGS. 6 and 7 are designated by the same reference numerals, yet another embodiment of the invention is comprised of a photomagnetic recording apparatus 90 and a photomagnetic reproducing apparatus 95. In this embodiment, the system for recording and reproducing is a partial response (1, 1) system (the so-called duo binary system).

As is well known, in the partial response system, the digital information is precoded before recording. In this embodiment, precoded digital information is recorded on photomagnetic record disk 10 by the pit forming method of the present invention, and a multi-value duo binary code reproducing signal is reproduced and is converted into a binary signal to recover the original digital information.

In photomagnetic recording apparatus 90, a composite signal S23 transmitted from a time division multiplexer 25 is applied to a synchronous address adder 31, and after a synchronous signal and an address signal are added thereto, as may be desired, the composite signal is supplied to a precode circuit 91.

The precode circuit converts a signal S90 (shown in FIG. 17A), comprised of the composite signal S23 with the synchronous signal and the address signal added thereto, into a record source signal S91 which is a binary signal adapted to be reproduced as a multi-value reproducing signal of duo binary code. The record source signal S91 is supplied to a pulse modulation circuit 33. Precode circuit 91 functions to sum the original digital information and information delayed therefrom by one bit clock period in modulo 2 form.

Pulse modulation circuit 33 generates a drive pulse signal S92, which is similar to the drive pulse signal S14 described above in conjunction with FIG. 5D or 5F, in response to the record source signal S91, and the drive pulse signal controls a record light beam 36 by way of an optical head processor 34 which drives a light source 35 formed of a laser diode to irradiate photomagnetic record disk 10.

Thus, in photomagnetic recording apparatus 90 of FIG. 15, the light source 35 is not driven directly by record source signal S91. Rather, the record source signal is pulse-modulated to form a drive pulse signal S92 generated with a predetermined period for intermittently driving light source 35 so that a substantially circular magnetic domain is formed at the start end of pit 4 recorded on photomagnetic record disk 10, similar to the first embodiment described herein, whereby the record information at the start end of pit 4 can be recorded unambiguously.

When the recorded information is reproduced from pit 4 formed on photomagnetic record disk 10, the photomagnetic reproducing apparatus (shown in FIG. 16) receives a light beam 51 reflected from the photomagnetic record disk by a light pickup 52 to supply a light reception output signal S95 produced by an optical head processor 53 to an equalizer 96. The equalizer converts light reception output signal S95 into a signal of duo binary code.

In practice, as shown in FIG. 18, the light reception output signal S95 produced by optical head processor 53 has a frequency characteristic T1, known as MTF (modulation transfer function), where the amplitude gain falls as the spatial frequency of the optical transmission system increases.

Consequently, in equalizer 96, the light reception output signal S95 is subjected to an equalizing characteristic T2 so as to convert the frequency characteristic T1 into the frequency characteristic of the duo binary code, whereby a light reception output signal corresponding to the frequency characteristic T3 of the duo binary code, i.e., the duo binary signal S96 (shown in FIG. 17B) is obtained.

As is well known, equalizer 96 functions to compress the frequency band of the duo binary signal by a factor of ½ in comparison to the frequency band of the original digital information of the binary signal and the logic level of the equalized dual binary signal has three values: V, O, −V. Of these values, V and -V correspond to logic level "1" of the original digital information, and 0 corresponds to the logic level "0". The level of the duo binary signal does not change directly from V to −V or from −V to V, but changes through the value 0.

Such a duo binary signal S96 is supplied to a duo binary decoder 97.

The duo binary decoder 97 functions to detect the binary logic level corresponding to the logic levels V, O,−V by comparing the duo binary signal to first and second reference levels TH1 and TH2 and is adapted to recover a reproduced output signal S97 (shown in FIG. 17C) corresponding to the original digital information. The reproduced output signal S97 is supplied to a synchronous address decoder 55.

Thus, a composite signal S51 similar to the composite signal S23 produced by time division multiplexer 25 of photomagnetic recording apparatus 90 is obtained by synchronous address decoder 55, and after video data included in the composite signal S51 is subjected to the error correction processing of an inner error correction circuit 56, the corrected data is deshuffled in a deshuffling circuit 57 and the deshuffled data is subjected to the outer error correction processing of an outer error correction circuit 58 and then, after error modification processing in an error modification circuit 59, it is transmitted as a video output signal S52V through a digital/analog converter 60.

At the same time, audio data included in the composite signal S51 also is supplied through an inner error correction circuit 61, a deshuffling circuit 62, an outer error correction circuit 63, an error modification circuit 64 and a digital/analog converter 65 to be transmitted as an audio output signal S52A.

Thus, in photomagnetic recording apparatus 90, the shape at the start end of pit 4 does not appear as the tear drop shape as in the prior art. Hence, pit 4 can be realized with good bit separation, and a photomagnetic reproducing method most suited for reproducing a duo binary code signal by a partial response (1, 1) system can be used.

As is well known, the duo binary code turns intercode interference to account and exhibits good intercode correlation. Consequently, the duo binary code may be affected by phase shift (for example, edge shift) in the transmission system and discrimination of the three logic levels is difficult. Therefore, the pit forming method of the present invention, which provides good bit separation, is preferred for the transmission of a multi-value signal such as the partial response (1, 1) system.

Thus, since the record information is reproduced with multiple values, the optical transmission system can be operated in the low spatial frequency band of MTF and the reproduced output signal S97 can be realized with the significantly improved c/N.

In the embodiments described above, the drive pulse signal S14 (FIG. 5D or 5F) is generated at the predetermined sampling period $T_s$ during the interval that the record signal S13 (FIG. 5C) exhibits its logic "1" level, whereby pit 4 having a magnetic domain of substantially circular shape is formed on the photomagnetic record disk. Alternatively, however, a record pit with a magnetic domain of circular shape may be formed only at the rising portion or at the falling portion of the record signal S13, while during the period between the rising and falling portions a drive signal of constant level may be generated, whereby the record pit having a constant shape similar to the central portion of the pit of the prior art (FIG. 2D) is formed.

In this invention, the risk of not reproducing accurately the position information at the leading and trailing edges of the record signal S13 is obviated because information is recorded on the photomagnetic record disk with much higher accuracy than the prior art. In an alternative embodiment, the drive pulse signal at the finishing end portion of the record pit may be omitted. Nevertheless, a magnetic domain of substantially circular shape may be formed similar to the case where the drive pulse is provided at the finishing end portion. In the embodiments described above, the pulse amplitude $P_H$ of the drive pulse signal S14 (FIG. 5D or 5F) is of constant value periodically during the interval that the record signal S13 exhibits the logic "1" level. Alternatively, however, this amplitude may be varied if desired.

In the embodiment described above in conjunction with FIGS. 15 and 16, the record information on the photomagnetic record disk is reproduced as a multiple value signal, such as duo binary code, by a partial response (1, 1) system. However, the present invention is not limited to duo binary code. Rather, multi-value reproducing may be carried out by other various systems, such as other partial response systems, whereby the advantages of the present invention may be realized.

What is claimed is:

1. Photomagnetic recording apparatus comprising:

means for applying a magnetic flux to a region of a photomagnetic recording medium;

a light source for irradiating said region of said recording medium with a recording light beam to form a pit;

record signal generating means for generating a record signal that is a frequency modulated carrier signal waveform having leading and trailing edges;

pulse generating means including delay means for delaying said record signal by discrete, successive time delays to produce delayed signals, and gating means for gating selected ones of said delayed signals to produce a predetermined number of pulses of predetermined width and spacing in response to at least the leading edge of said record signal; and drive means for receiving said predetermined number of pulses and driving said light source to produce on said photomagnetic recording medium a group of substantially circular magnetic domains at the beginning of said pit.

2. The apparatus of claim 1 wherein said predetermined number of pulses are supplied to said drive means to produce isolated, substantially circular magnetic domains at least at the beginning of said pit.

3. The apparatus of claim 1 wherein said predetermined number of pulses are supplied to said drive means to produce overlapping, substantially circular magnetic domains at least at the beginning of said pit.

4. The apparatus of claim 1 wherein said pulse generating means generates plural pulses of predetermined width and spacing in response to the trailing edge of said record signal, said plural pulses being supplied to said drive means to produce isolated, substantially circular magnetic domains at the end of said pit.

5. The apparatus of claim 1 wherein said pulse generating means generates plural pulses of predetermined width and spacing in response to the trailing edge of said record signal, said plural pulses being supplied to said drive means to produce overlapping, substantially circular magnetic domains at the end of said pit.

6. The apparatus of claim 1 wherein said delay means comprises a plurality of delay elements connected in series.

7. The apparatus of claim, 6 wherein said plurality of delay elements comprises eight delay elements, each exhibiting a delay time $\tau$.

* * * * *